United States Patent [19]

Moggi et al.

[11] Patent Number: 4,530,969
[45] Date of Patent: Jul. 23, 1985

[54] CO-VULCANIZABLE COMPOSITIONS BASED ON FLUORELASTOMERS AND POLYMERIC COMPOUNDS WITH A PERFLUOROETHERIC STRUCTURE

[75] Inventors: Giovanni Moggi; Luciano Flabbi, both of Milan; Ezio Strepparola, Treviglio, all of Italy

[73] Assignee: Montedison S.p.A., Milan, Italy

[21] Appl. No.: 511,263

[22] Filed: Jul. 6, 1983

[30] Foreign Application Priority Data

Jul. 7, 1982 [IT] Italy ................ 22272 A/82

[51] Int. Cl.$^3$ ............ C08L 15/02; C08L 27/08; C08L 71/00; C08L 77/00
[52] U.S. Cl. ................ 525/180; 525/185; 525/186; 525/189; 525/190
[58] Field of Search ........... 525/185, 186, 178, 180, 525/189, 90; 524/520, 538

[56] References Cited

U.S. PATENT DOCUMENTS

| | | | |
|---|---|---|---|
| 3,712,877 | 1/1973 | Patel et al. | 525/340 |
| 3,851,018 | 11/1974 | Kelly | 524/520 |
| 3,876,654 | 4/1975 | Pattison | 524/315 |
| 3,976,603 | 4/1976 | Caporiccio et al. | 528/401 |
| 4,035,565 | 7/1977 | Apotheker et al. | 525/254 |
| 4,080,319 | 3/1978 | Capporicio et al. | 528/183 |
| 4,259,463 | 3/1981 | Moggi et al. | 525/326.3 |
| 4,278,776 | 7/1981 | Mauro et al. | 525/178 |

Primary Examiner—Allan M. Lieberman

[57] ABSTRACT

Elastomeric compositions vulcanizable with peroxides, consisting of a fluoroelastomer based on vinylidene fluoride and containing small quantities of brominated or iodinated olefine as comonomer, admixed with from 1% to 25% by weight of perfluoropolyether or polycondensation derivatives thereof such as perfluoropolyamides.

6 Claims, No Drawings

CO-VULCANIZABLE COMPOSITIONS BASED ON FLUORELASTOMERS AND POLYMERIC COMPOUNDS WITH A PERFLUOROETHERIC STRUCTURE

BACKGROUND OF THE INVENTION

In the field of development of fluorinated elastomers, in later times well defined requirements have experienced a growing strenghtening, that is, the contemporaneous solution of at least one of the aims of group A and one of the aims of Group B as follows:

A—A general improvement in the mixes of the rheological characteristics and the processability, a reduction of the hardness and possibility for an easy extrusion of manufactured articles.

B—A high resistance to steam at high temperature and to inorganic acids, and high chemical stability against recent type of lubricants additioned with aminic compounds, such as the oils of the SF series.

The aims or objects of group A were persued in the past with the help of process-assisting agents of the plasticizing type or by means of various lubricants. The products used so far for this purpose, such as polyesters, polyethylene, pentaerythritol tetrastearate, wax and the likes, etc. did not prove to be suited because they cause an appreciable decay of the typical characteristics of the fluorinated elastomers.

A considerable technical improvement was at a certain point introduced by the use of fluoropolyamides as "process-coadjuvants" for fluoroelastomers based on vinylidene fluoride. It was thus possible, operating according to the procedures described in Italian Patent Publication No. 23572 A/79, to achieve all the objects of point A. Nevertheless, the chemical stability values achieved made these products unsuitable for particular applications, such as for instance oil sealing rings, pipes and gaskets in contact with water and steam at high temperatures.

The achievement of the objects of point B was possible by operating according to the procedures described in U.S. Pat. No. 4,035,565 (Du Pont) and in French Pat. No. 2,386,561 (Daikin). The polymers prepared according to the teachings of the above cited patents differ from the preceding types of fluoroelastomers based on vinylidene fluoride, in as much as they contain carbon-bromine or carbo-iodine bonds. They display a high bulk viscosity further turn out to have processability characteristics inferior to those of the elastomers vulcanizable with bisphenols and are free of carbon-bromine or carbon-iodine bonds. These latter are prepared according to the procedures described, for instance, in U.S. Pat. Nos. 3,876,654—3,712,877 and 4,259,463.

More particularly, in the extrusion processes for the above said polymers, containing carbon-bromine or carbon-iodine bonds, there are required, at equal productivity, higher shearing forces, while there are observed superficial irregularities at lower flow rates (with respect to the fluoroelastomers based on vinylidene fluoride which do not contain vulcanization spots with C-Br and C-1 bonds and are vulcanizable with bisphenols).

With the products obtained according to this teaching it is not possible, however, to achieve all objects of group A. Also as far as the hardness is concerned, the values are always higher than 75 SHORE. Improvements of these characteristics, obviously may be achieved by means of process-coadjuvants of the type of traditional plasticizers and lubricants, but still with the drawbacks already mentioned influencing the properties of the vulcanized products obtained.

THE PRESENT INVENTION

It has now been found that the above cited drawbacks may be avoided by the use of co-vulcanizable compounds derived from perfluoropolyethers. Such compounds, that shall be used in quantities comprised between 1% and 25% by weight on the fluoro-elastomer, have a polymeric structure formed of repetitive units represented by the formula:

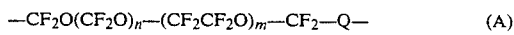

$$-CF_2O(CF_2O)_n-(CF_2CF_2O)_m-CF_2-Q- \quad (A)$$

wherein: $CF_2O$ and $-CF_2CF_2O$ are oxyperfluoroalkylen units, which prove contemporaneously present and statistically distributed along the chain; where indexes n and m are integers comprised between 2 and 100 and the sum of n+m is a number comprised between 5 and 200, but preferably between 15 and 100, while ratio m/m is comprised between 0.2 and 1.5, but preferably is comprised between 0.3 and 1.2, and wherein Q is an organic radical chosen between:

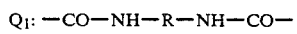

$Q_1$: $-CO-NH-R-NH-CO-$

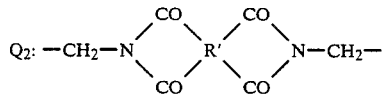

$$Q_2: -CH_2-N\begin{matrix}CO\\ \\CO\end{matrix}R'\begin{matrix}CO\\ \\CO\end{matrix}N-CH_2-$$

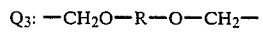

$Q_3$: $-CH_2O-R-O-CH_2-$

In compounds of class A ($Q_1$), R is a bivalent radical chosen from amongst:

(a) alkylenes containing from 2 to 20 carbon atoms, but preferably from 6 to 12, possibly with alkyl substituents in the main chain;

(b) cycloalkylenes containing from 5 to 10 carbon atoms, possibly with alkyl substituents;

(c) heterocyclic radicals with a ring of 5 or 6 atoms (d) arylene or alkylarylene radicals with one or more benzene rings, possibly linked to each other by O, S atoms or by: $-CO-$, $-SO-$, $-NH-$, $-SO_2-$, alkenyl groups.

The above indicated polyamides obtained from perfluorinated ethers, are amply described in U.S. Pat. No. 3,876,617. In said patent there is also described the preparation of the polyamides in question by means of the polycondensation of bifunctional amines with methyl or phenyl esters of polyoxaperfluoroalkandioic acids of the formula: $ROOC-CF_2O(CF_2CF_2O)m-(CF_2O)-n-CF_2COOR$ (where R is methyl or phenyl), in admixture with a certain quantity of the corresponding monocarboxylic containing, that is, an inactive terminal group of the type: $-OCF_3$, $-OCF_2Cl$, $-OCHF_2$.

The compounds of group A ($Q_2$) are fluorinated polyamides in which R' is an aliphatic or aromatic tetravalent radical containing from 2 to 20 carbon atoms, but preferably from 6 to 12 carbon atoms possibly with alkyl substituents in the main chain. Said radicals may contain one or more benzene or alicyclic rings possibly linked to each other by: O, S, or $-CO-$, $-SO-$, $SO_2$, $-NH-$ groups.

The above mentioned polyamides derived from perfluorinated ethers are amply described in U.S. Pat. No. 4,080,319. In that patent there is also described the preparation of the polyamides in question by polycondensation of the derivatives of one or more tetracarboxylic acids or of the diamines of the formula:

$$H_2N-CH_2-CF_2O(CF_2CF_2O)_m-(CF_2O)_n-CH_2-NH_2$$

wherein the values of n and m are the same as those of formula (A).

The compounds of group A($Q_3$) are polyethers wherein R has the same meaning it has in the compounds of group $Q_1$.

The above mentioned polyethers are amply described in U.S. Pat. No. 3,976,603.

The above defined perfluoropolyether derivatives, which are useful as additives for fluoroelastomers according to this invention, have such a degree of polycondensation that their inherent viscosity, measured at 20° C., at a concentration of 0.3% by weight, in an admixture of 1,1,3-trichlorotrifluoroethane with dimethylformamide in a 4:1 by volume ratio, proves to be comprised between 0.2 and 0.9 dl/g.

With reference to formula A ($Q_1$), PREFERRED COMPOUNDS are those in which R is:

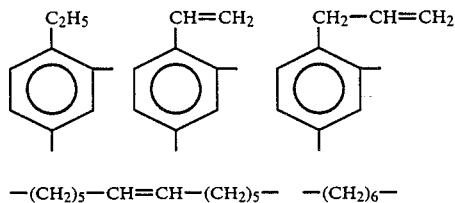

—(CH$_2$)$_5$—CH=CH—(CH$_2$)$_5$—   —(CH$_2$)$_6$— for which the necessary intermediates are respectively: 1-ethyl-2,4-benzenediamine; 1-vinyl-2,4-benzenediamine; 1-allyl-2,4-benzenediamine; 6-dodecen-1,12-diamine, hexandiamine; 2,4-toluendiamine. Amongst the polyamides of general formula A ($Q_2$) the preferred compounds are those in which R' is:

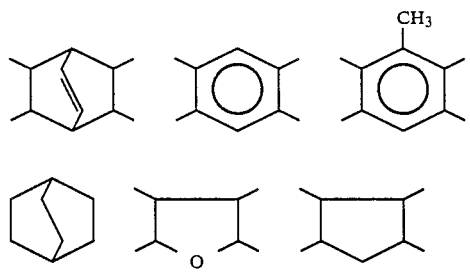

for which the necessary intermediates are respectively:
dianhydride of bicyclooctentetracarboxylic acid
dianhydride of pyromellitic acid
dianhydride of methylpyromellitic acid
dianhydride of bicyclooctantetracarboxylic acid
dianhydride of furantetracarboxylic acid
dianhydride of cyclopentantetracarboxylic acid Also usable are mixtures of these compounds. Amongst the polyethers of formula A ($Q_3$) there are preferred those in which R=

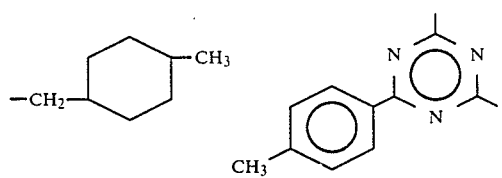

for which the necessary intermediates are:
α,α'-dichloro-p.xylol
p.tolyl-dichlorotriazine sim.
1,4-dichloro-butene-2.

The compositions of the molecules according to this invention and the results of the vulcanization have been recorded on Tables I–IV.

For comparative purposes there are recorded tests with mixes of fluoroelastomers free of compounds of general formula A as well as tests with coadjuvants of the Prior Art.

Fluoroelastomer 3: elastomeric vinylidene fluoride, hexafluoropropene and tetrafluoroethylene in a molar ratio of about 3:1:1 and containing 0.4% in mols of CF$_2$CHBr, with a specific weight at 25° C.=1.86 g/cu.cm and a Mooney ML (1+4) viscosity at 100° C.=98. This copolymer was prepared in 5 l autoclave filled with 3.5 l water, 2 g/l ammonium persulfate and hexafluoropropene till 6 Atm. and feeding during the polymerization 2 g/l sodium bisulfite, 2 g/l Mohr salt and a gaseous mixture of vinylidene fluoride 61%, hexafluoropropene 20%, tetrafluoroethylene 18.6% and difluoro-bromoethylene 0.4% by mols. The temperature was kept at 36° C. and the pressure at 20 Atm. The polymerization was carried out for two hours, obtained conversion 10 mols monomers in total, obtained polymerizate about 900 g.

Ingredients used in the mixes

Fluoroelastomer 1: elastomeric vinylidene fluoride, hexafluoropropene and tetrafluoroethylene copolymer in a molar ratio of about 2:1:1 and containing 0.5% in mols of C$_2$F$_3$Br, with a Mooney ML (1+4) viscosity at 100° C.=85 and with a specific weight at 25° C.=1.88 g/cu.cm.

Fluoroelastomer 2: elastomeric copolymer of vinylidene fluoride/hexafluoropropene/tetrafluoroethylene in a molar ratio of about 3:1:1 and containing 0.5% in mols of C$_2$F$_3$Br, a specific weight of 1.86, a Mooney ML (1+4) viscosity at 100° C.=130.

Fluoroelastomer 3: elastomeric copolymer like fluoroelastomer 2 but not containing C$_2$F$_3$Br.

Fluoroelastomers: "AFLAS 100" and "AFLAS 150" (trade marks of Asahi Glass Co.): elastomeric copolymers of the tetrafluoroethylene with propylene.

Polymeric additive 1: polyamide of general formula A ($Q_1$) wherein R=—(CH$_2$)$_6$; prepared according to what described in U.S. Pat. No. 3,876,617 and having an inherent viscosity equal to 0.40

Polymeric additive 2: polyamide of general formula A ($Q_1$) wherein:

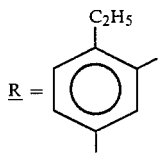

having an inherent viscosity = 0.30

Polymeric additive 3: polyamide of general formula A(Q$_1$) wherein:

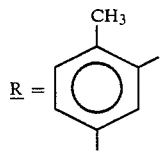

having an inherent viscosity equal to 0.35.

Polymeric additive 4: copolyamide of general formula A(Q$_2$) wherein: R consists of the groups:

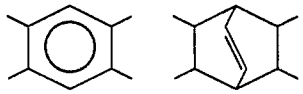

in equimolecular quantity and whose preparation is described in U.S. Pat. No. 4,030,319. The inherent viscosity is equal to 0.60.

Polymeric additive 5: polyether of general formula A(Q$_3$) wherein:

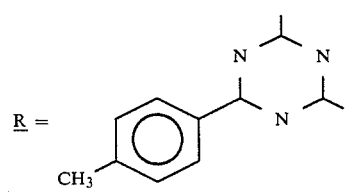

prepared as described in U.S. Pat. No. 3,976,603. The inherent viscosity equals 0.40.

PROXIMON F40 (Montedison trade mark): $\alpha\alpha'$-bis-(t-butylperoxy)-diisopropylbenzene at 40% in calcium carbonate.

DIAK-7 (Du Pont trade mark): triallylisocyanurate

CARBONBLACK MT.

ACCELERATOR: Benzyl, tris(dimethylamino)-phosphoniotetrafluoroborate.

MAGLITE D: magnesium oxide.

EXAMPLES 1–17

TABLES 1 and 2 report the results obtained by the use of the covulcanizable compositions object of the present invention in which the examined fluoroelastomers are based on vinylidene fluoride. In these compositions are evidenced the improvements obtained with regard to the hardness as well as in the extrusion forming of complex profiles, improvements that are observed already at low levels of co-vulcanizable agent of general formula A(Q$_1$, Q$_2$ and Q$_3$).

These covulcanizable agents have been used at levels comprised between 2.5 and 20 phr, obtaining appreciable advantages especially with regard to the extrusion of complex profiles (ASTM 2230 standard, Garvey A) also at a low level of polymeric additive. The quantities appearing in the tables are expressed in parts by weight.

EXAMPLES 18–25

TABLE III reports the results obtained by using the covulcanizable compositions object of the present invention, wherein the tested fluoroelastomers are copolymers chosen from between tetrafluoroethylene and propylene (AFLAS 100 and AFLAS 150). In these fluoroelastomers are brought to evidence the improvements obtained with regard to the hardness and in the extrusion of complex profiles.

These agents have been used at levels comprised between 2.5 and 10%, thereby obtaining considerable advantages, especially with regard to the extrusion of complex profiles (ASTM 2230 standards, Garvery A) also at a lower level of polymeric additive.

On Table 4 there is compared the behavious of a fluoroetheric polyamide in combination with the fluoroelastomer 3, vulcanizable with bisphenol (see examples 26–31), with the behaviour of the same polyamide when in combination with the fluoroelastomers 2 containing peroxydic C-Br vulcanization points (examples 32–34).

The results show that, while the hardness and extrudability are almost the same in the two cases, the chemical stability is definitely better in the products vulcanized with peroxides.

TABLE I

| | Examples | | | | | | |
|---|---|---|---|---|---|---|---|
| | 1 | 2 | 3 | 4 | 5 | 6 | 7 |
| Fluoroelastomer 1 | 100 | 100 | 100 | 100 | 100 | 100 | 100 |
| PbO | 3 | 3 | 3 | 3 | 3 | 3 | 3 |
| Carbon black MT | 25 | 25 | 25 | 25 | 25 | 25 | 25 |
| Polymeric additive 1 | — | 2,5 | 5 | 10 | — | — | — |
| Polymeric additive 3 | — | — | — | — | 2,5 | 5 | 10 |
| Peroximon F40 | 10 | 10 | 10 | 10 | 10 | 10 | 10 |
| DIAK-7 | 4 | 4 | 4 | 4 | 4 | 4 | 4 |
| VULCANIZATION: PRESS 10' × 175° C., OVEN 24$^h$ × 200° C. | | | | | | | |
| CHARACTERISTICS OF VULCANIZED PRODUCT: Mechanical properties | | | | | | | |
| Modulus at 100% Kg/cm$^2$ | 45 | 42 | 40 | 38 | 41 | 39 | 37 |
| Breaking load Kg/cm$^2$ | 110 | 98 | 95 | 90 | 100 | 94 | 88 |
| Elongation at break % | 200 | 198 | 205 | 200 | 195 | 200 | 190 |
| Hardness (Shore A) | 77 | 69 | 67 | 65 | 69 | 66 | 66 |
| Chemical stability | | | | | | | |
| After treatment with: Oil, SHELL 15W 40HD Super 3, 3 gg × 175° C.; | | | | | | | |
| volume variation in % | 0,8 | 0,8 | 0,9 | 1,1 | 0,8 | 0,9 | 1,2 |
| modulus var. at 100% | −15 | −15 | −16 | −18 | −16 | −18 | −19 |
| var. break. load in % | −37 | −38 | −41 | −40 | −39 | −40 | −38 |
| Elongation var. at br % | −28 | −28 | −28 | −28 | −29 | −30 | −29 |
| saturated steam for 7 days at 162° C. | | | | | | | |
| vol. variation % | 1,3 | 1,3 | 1,4 | 1,6 | 1,5 | 1,5 | 1,6 |
| Break. load var. % | −19 | −20 | −23 | −24 | −21 | −22 | −23 |
| Elong. at br. var. % | +3 | +3 | +5 | +6 | +4 | +5 | +7 |
| Extrudability test According ASTM D2230-73 GARVEY A | | | | | | | |

TABLE I-continued

| | Examples | | | | | | |
|---|---|---|---|---|---|---|---|
| | 1 | 2 | 3 | 4 | 5 | 6 | 7 |
| FIG. 5 | | | | | | | |
| EDGE | | 4 | 7 | 8 | 8 | 7 | 8 | 8 |
| SURFACE | | B | A | A | A | A | A | A |

TABLE II

| | Examples | | | | | | | | | |
|---|---|---|---|---|---|---|---|---|---|---|
| | 8 | 9 | 10 | 11 | 12 | 13 | 14 | 15 | 16 | 17 |
| Fluoroelastomer (2) | 100 | 100 | 100 | 100 | 100 | 100 | 100 | 100 | 100 | 100 |
| Fluoroelastomer (3) | | | | | | | | | | |
| PbO | 3 | 3 | 3 | 3 | 3 | 3 | 3 | 3 | 3 | 3 |
| Carbon black MT | 25 | 25 | 25 | 25 | 25 | 25 | 25 | 25 | 25 | 25 |
| Polymeric additive (2) | — | 20 | 10 | — | — | — | — | 5 | 2,5 | — |
| Polymeric additive (4) | — | — | — | 20 | 10 | — | — | — | — | 5 |
| PEROXIMON F40 | 10 | 10 | 10 | 10 | 10 | 10 | 10 | 10 | 10 | 10 |
| DIAK-7 | 4 | 4 | 4 | 4 | 4 | 4 | 4 | 4 | 4 | 4 |
| Polymeric additive (5) | — | — | — | — | — | 20 | 10 | — | — | — |
| VULCANIZATION: PRESS 165° C. × 30 ' - OVEN 24$^h$ × 200° C. | | | | | | | | | | |
| Mechanical properties: | | | | | | | | | | |
| Modulus at 100% Kg/cm$^2$ | 140 | 50 | 90 | 80 | 95 | 85 | 110 | 100 | 115 | 105 |
| Breaking load Kg/sq. cm. | 182 | 100 | 135 | 140 | 138 | 115 | 150 | 120 | 125 | 145 |
| Elongation at break in % | 136 | 175 | 150 | 155 | 145 | 150 | 140 | 145 | 140 | 140 |
| IRHD hardness | 77 | 60 | 62 | 64 | 70 | 64 | 69 | 62 | 65 | 72 |
| Brittleness point according ASTM D 746° C. | −25 | −38 | −33 | −39 | −32 | −38 | −33 | −32 | −29 | −32 |
| Compression set, method B (ASTM D395) for 70 h at 200° C. | 35 | 39 | 37 | 39 | 36 | 36 | 35 | 36 | 36 | 35 |
| Extrusion: | | | | | | | | | | |
| ASTM D 2230 GARVEY A: | | | | | | | | | | |
| Edge | 5 | 7 | 7 | 7 | 8 | 7 | 8 | 8 | 7 | 8 |
| Surface | B | A | A | A | A | A | A | A | A | A |

TABLE III

| | Examples | | | | | | | |
|---|---|---|---|---|---|---|---|---|
| | 18 | 19 | 20 | 21 | 22 | 23 | 24 | 25 |
| AFLAS 100 | 100 | 100 | 100 | 100 | | | | |
| AFLAS 150 | | | | | 100 | 100 | 100 | 100 |
| PEROXIMON F40 | 7 | 7 | 7 | 7 | 7 | 7 | 7 | 7 |
| DIAK - 7 | 3 | 3 | 3 | 3 | 3 | 3 | 3 | 3 |
| CARBON BLACK MT | 25 | 25 | 25 | 25 | 35 | 35 | 35 | 35 |
| Polymeric additive 2 | — | 2,5 | 5 | 10 | 0 | 2,5 | 5 | 10 |
| VULCANIZATION CONDITIONS: Press at 160° C. × 30'; OVEN: at 160° C. × 1$^h$, 180° C. × 1$^h$, 200° C. × 2$^h$ | | | | | | | | |
| Properties of vulcanized product: | | | | | | | | |
| Modulus at 100% (ASTM D412) kg/cm$^2$ | 35 | 32 | 31 | 31 | 35 | 33 | 31 | 30 |
| Breaking load kg/cm$^2$ | 133 | 105 | 100 | 98 | 150 | 115 | 110 | 105 |
| Elong. at break in % | 350 | 330 | 320 | 320 | 340 | 330 | 320 | 330 |
| Shore-A D2240 | 66 | 62 | 60 | 58 | 70 | 65 | 64 | 61 |
| Brittle point D 746° C. | −40 | −41 | −42 | −43 | — | — | — | — |
| Extrusion: | | | | | | | | |
| ASTM D2230 GARVEY A: | | | | | | | | |
| Edge | 3 | 5 | 6 | 6 | 4 | 5 | 6 | 6 |

TABLE IV

| | Examples | | | | | | | | | |
|---|---|---|---|---|---|---|---|---|---|---|
| | 26 | 27 | 28 | 29 | 30 | 31 | 32 | 33 | 34 | 35 |
| Fluoroelastomer 2 | — | — | — | — | — | — | 100 | 100 | 100 | — |
| Fluoroelastomer 3 | 100 | 100 | 100 | 100 | 100 | 100 | — | — | — | — |
| Bisphenol AF | 1,8 | 1,8 | 1,8 | 1,8 | 1,8 | 1,8 | | | | |
| Accelerator agent | 0,4 | 0,4 | 0,4 | 0,4 | 0,4 | 0,4 | | | | |
| Calciumhydroxide | 5 | 5 | 5 | 5 | 5 | 5 | | | | |
| Maglite D | 5 | 5 | 5 | | | | | | | |
| PEROXIMON F40 | | | | | | | 8 | 8 | 8 | |
| DIAK-7 | | | | | | | 3 | 3 | 3 | |
| Lead oxide | | | | 5 | 5 | 5 | 3 | 3 | 3 | |
| Polymeric additive 2 | — | 10 | 5 | — | 5 | 10 | 10 | 5 | — | |
| Carbon black MT | 25 | 25 | 25 | 25 | 25 | 25 | 25 | 25 | 25 | |
| VULCANIZATION: PRESS at 165° C. × 8' - 175° C. × 10' - OVEN: 200° C. × 24$^h$ | | | | | | | | | | |
| Properties of vulcanized product | | | | | | | | | | |
| Modulus at 100% kg/cm$^2$ | 65 | 50 | 60 | 64 | 61 | 52 | 50 | 52 | 56 | |
| Breaking load in kg/cm$^2$ | 160 | 120 | 145 | 158 | 150 | 125 | 170 | 180 | 200 | |
| Elong. at break % | 200 | 220 | 200 | 205 | 200 | 215 | 220 | 200 | 210 | |
| IRHD hardness | 73 | 66 | 69 | 75 | 69 | 66 | 66 | 70 | 75 | |

TABLE IV-continued

| | Examples | | | | | | | | | |
|---|---|---|---|---|---|---|---|---|---|---|
| | 26 | 27 | 28 | 29 | 30 | 31 | 32 | 33 | 34 | 35 |
| Chemical stability | | | | | | | | | | |
| Resistance to steam ΔV % | +20 | +24 | +22 | +5,1 | +6,3 | 7 | 1,2 | 1,1 | 1 | |
| 7 days × 162° C. Δload % | −30 | −35 | −32 | −44 | −47 | −51 | −30 | −26 | −20 | |
| Δelong. | +40 | +44 | +42 | +80 | +90 | +105 | +6 | +7 | +6 | |
| Resistance to acids: | | | | | | | | | | |
| HCl 37% for 7 days × 70° C. | | | | | | | | | | |
| ΔV % | | | | 4 | 4,5 | 7,5 | 7,5 | 6 | 5 | |
| Δload % | | | | −13 | −16 | −14 | −14 | −13 | −12 | |
| Δelong. % | | | | +20 | +22 | | 8 | 8 | 20 | |
| Resistance to lubricating oils of the type SHELL 15W40HD SUPER 3 3 days at 175° C. | | | | | | | | | | |
| V % | 1,3 | 1,2 | 1,2 | | | | 1,3 | 1,1 | 1,1 | |
| MODULUS % | 7 | 8 | 10 | | | | −19 | −17 | −16 | |
| load % | −52 | −52 | −55 | | | | −40 | −39 | −38 | |
| elongation at break % | −35 | −34 | −36 | | | | −30 | −31 | −30 | |
| Extrusion: | | | | | | | | | | |
| ASTM D22S0 GARVEY A: | | | | | | | | | | |
| Swelling of extruded product % | 9 | 6 | 5 | 9 | 6 | 6 | 5 | 6 | 10 | |
| Edge | 3 | 6 | 5 | 3 | 5 | 6 | 6 | 6 | 3 | |

What we claim is:

1. An elastomeric composition vulcanizable with peroxides, consisting of a fluoroelastomer based on vinylidene fluoride containing small quantities of brominated or iodinated olefin as a comonomer with the function of vulcanization point, admixed with a quantity of from 1% to 25% by weight of polymeric perfluoropolyether consisting of repeating units represented by general formula:

$$-CF_2O(CF_2O)_n-(CF_2CF_2O)_m-CF_2Q-$$

wherein: n and m are integers from 2 to 100, the sum n+m is comprised between 5 and 200 while the m/n ratio is comprised between 0.2 and 1.5, and where Q is a bivalent radical selected from the group consisting of $$-CO-NH-R-NH-CO-,$$

and $$-CH_2-O-R-O-CH_2-,$$

wherein: R is a bivalent radical selected from the group consisting of
   (a) alkylenes containing from 2 to 20 carbon atoms;
   (b) cycloalkylenes containing from 5 to 10 carbon atoms and such cycloalkylenes containing alkyl substituents;
   (c) heterocyclic radicals having a ring of 5 or 6 atoms; and
   (d) arylene or alkylarylene radicals having one or more benzene rings and such radicals in which benzene rings are linked to each other by O or S atoms or by —CO—, —SO—, —NH— or —SO$_2$—, or by alkylene groups, and R' is an aliphatic, or aromatic or alicyclic tetravalent radical containing from 2 to 20 carbon atoms, said polymeric perfluoropolyether being further characterized by an inherent viscosity, measured in a concentration of 0.3% by weight, at 20° C., in a solvent mixture of CF$_2$Cl—CFCl$_2$/dimethylformamide in a volumetric ratio of 4:1, comprised between 0.2 and 0.9 dl/g.

2. An elastomeric composition according to claim 1, characterized in that radical Q of the polymeric perfluoropolyester has the following structure:

$$-CO-NH-(CH_2)_6-NH-CO-$$

3. An elastomeric composition according to claim 1, characterized in that radical Q of the polymeric perfluoropolyether has the following structure:

4. An elastomeric composition according to claim 1, characterized in that radical Q of the polymeric perfluoropolyether has the structure:

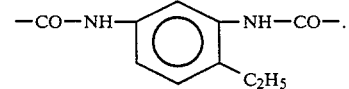

5. An elastomeric composition according to claim 1, characterized in that radical Q of the polymeric perfluoropolyether has the following structure:

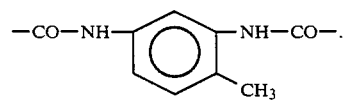

6. An elastomeric composition according to claim 1, characterized in that radical Q of the polymeric perfluoropolyether has the structure:

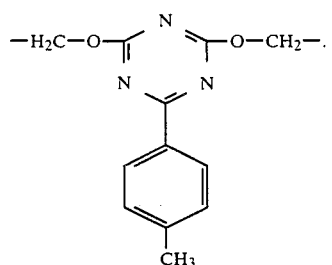
11
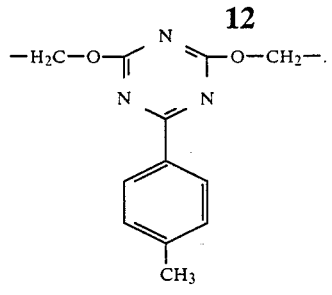
12
* * * * *